United States Patent [19]

Zupan

[11] Patent Number: 5,297,858
[45] Date of Patent: Mar. 29, 1994

[54] SAFETY COUPLER-AIR BRAKE INTERLOCK

[75] Inventor: Peter F. Zupan, Ottobrunn, Fed. Rep. of Germany

[73] Assignee: Wabash National Corporation, Lafayette, Ind.

[21] Appl. No.: 897,290

[22] Filed: Jun. 11, 1992

[51] Int. Cl.⁵ .............................. B60F 1/04; B60T 8/18
[52] U.S. Cl. .................................. 303/22.6; 105/159; 410/80; 303/22.7
[58] Field of Search ................ 303/28, 7.9, 22.1, 22.6, 303/22.7; 188/151 A, 153 P; 105/152; 410/45, 57, 80, 81, 91

[56] References Cited

U.S. PATENT DOCUMENTS

| | | | |
|---|---|---|---|
| 284,154 | 8/1883 | Wilson | 303/22.6 |
| 2,963,986 | 12/1960 | Dobson | 105/159 |
| 3,552,325 | 1/1971 | Enochian | 410/81 |
| 4,416,571 | 11/1983 | Krause | 410/45 |
| 4,792,269 | 12/1988 | Engle | 410/80 |

FOREIGN PATENT DOCUMENTS 0075764 6/1983 European Pat. Off. .

Primary Examiner—Matthew C. Graham
Attorney, Agent, or Firm—Trexler, Bushnell, Giangiorgi & Blackstone, Ltd.

[57] ABSTRACT

A safety interlock for an intermodal train has a locking pin shiftable for locking a coupling pin in a coupling position. An air valve is associated with the locking pin for providing an air pressure signal when the locking pin is retracted, which signal actuates another air valve for venting the brake pipe of a braking system.

5 Claims, 3 Drawing Sheets

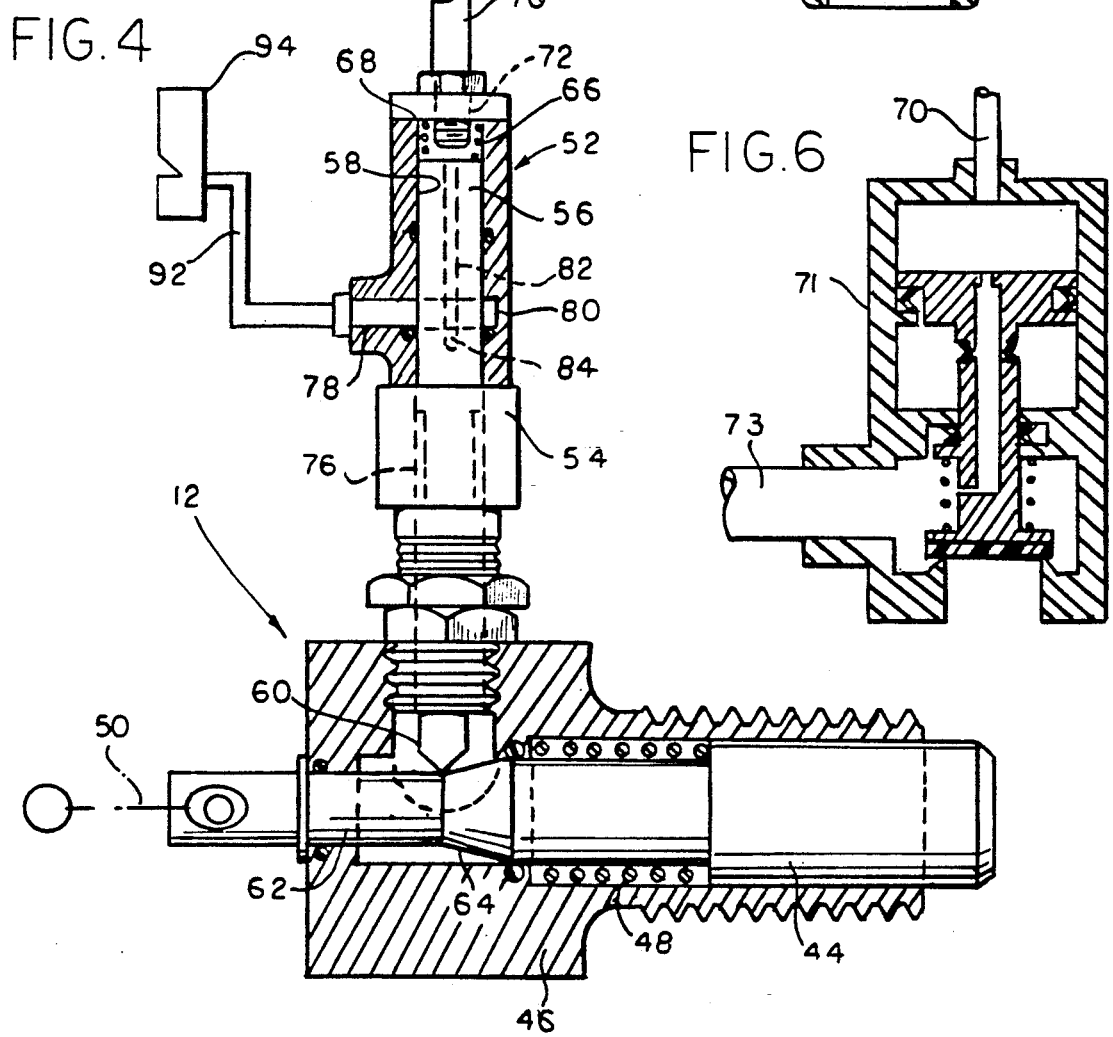

SAFETY COUPLER-AIR BRAKE INTERLOCK

BACKGROUND OF THE INVENTION

The present invention relates to a safety brake system for railroad trains and, more specifically, to a novel safety interlock between a coupler for adjacent sections of a train and an air brake.

Bimodal semi-trailers have been proposed for transportation either over highways or on railway lines. When connected for use on railway lines, successive trailers are coupled either to each other or to a railway bogie adapter in a train. In either event, a coupling mechanism is provided. Safety considerations demand that the coupling mechanism be fully engaged so as to ensure proper connection with a trailer.

Various suggestions have been made for ensuring proper positioning of the coupling mechanism. For example, it has been suggested to provide visual signals int he form of mechanically operated flags or handles interconnected with a coupling pin or other coupling mechanism, so that a trainman can see whether or not the coupling mechanism is properly positioned. It has also been suggested to install means, such as a whistle, providing an audible signal, which whistle is operated by air under the control of a valve responsive to the position of the coupling mechanism. Such prior suggested safety mechanisms have required the presence of a trainman to detect the signal, and subsequent action by the trainman to correct an improper coupling situation.

OBJECTS AND SUMMARY OF THE INVENTION

It is an object of the present invention to provide a novel interlock between a vehicle coupling mechanism and a vehicle braking system for preventing movement of the vehicle in the event proper coupling has not been obtained.

A more specific object of the present invention is to provide a novel interlock between a coupling mechanism and an air brake system in a bimodal train, which interlock functions to actuate the braking system for preventing movement of the trailers in the event proper coupling is not obtained, and also in the event of an accidental or unintentional decoupling of adjacent vehicles in a train.

A more specific object of the present invention is to provide a novel interlock of the above-described type connected with an air line or brake pipe of a conventional railway emergency braking system, and constructed for causing a loss of pressure in the brake pipe sufficient to activate emergency braking in the absence of proper coupling.

A still further object of the present invention is to provide a novel interlock of the above-described type capable of providing a signal to a trainman, along with automatic operation of the emergency braking system.

Other objects and advantages of the present invention will become apparent from the following description and the accompanying drawings.

An interlock incorporating features of the present invention comprises a valve unit mounted in association with a coupling pin mechanism. The valve unit has a valve body with an air inlet connected to the brake pipe through an emergency brake valve or relay valve, and an air outlet vented and preferable eventually connected with a signaling device. A valve element is shiftable within the body in response to movement of the coupling pin in a manner such that the valve outlet is closed when the coupling pin is properly in a coupling position and the valve outlet is open, permitting flow of air under pressure through the outlet when the coupling pin is retracted. Thus, when the coupling pin is retracted, or not in a proper coupling position, an air pressure signal will be sent to the emergency brake or relay valve for causing actuation of the emergency braking system. In addition, air from the outlet may be directed to a signaling device, such as a whistle, for providing an audible signal to a trainman.

BRIEF DESCRIPTION OF THE DRAWINGS

FIG. 3 is a fragmentary, partial, sectional view taken generally along line 3—3 in FIG. 2, and showing a locking pin and safety unit incorporating features of the present invention associated with a coupling pin;

FIG. 4 is a further enlarged, partial, sectional view showing a locking pin and safety unit incorporating features of the present invention;

FIG. 6 is a simplified sectional view of a representative relay valve incorporated in the present invention.

DESCRIPTION OF A PREFERRED EMBODIMENT

Figure 1:
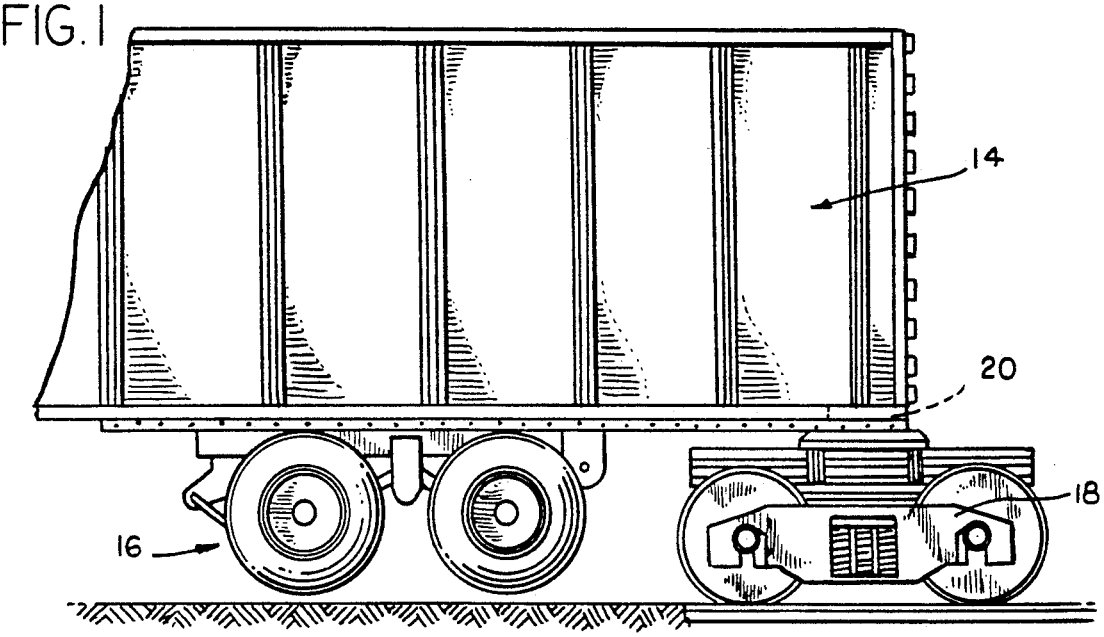
FIG. 1 is a fragmentary, simplified side elevational view showing a bimodal trailer mounted on a bogie.
Figure 5:
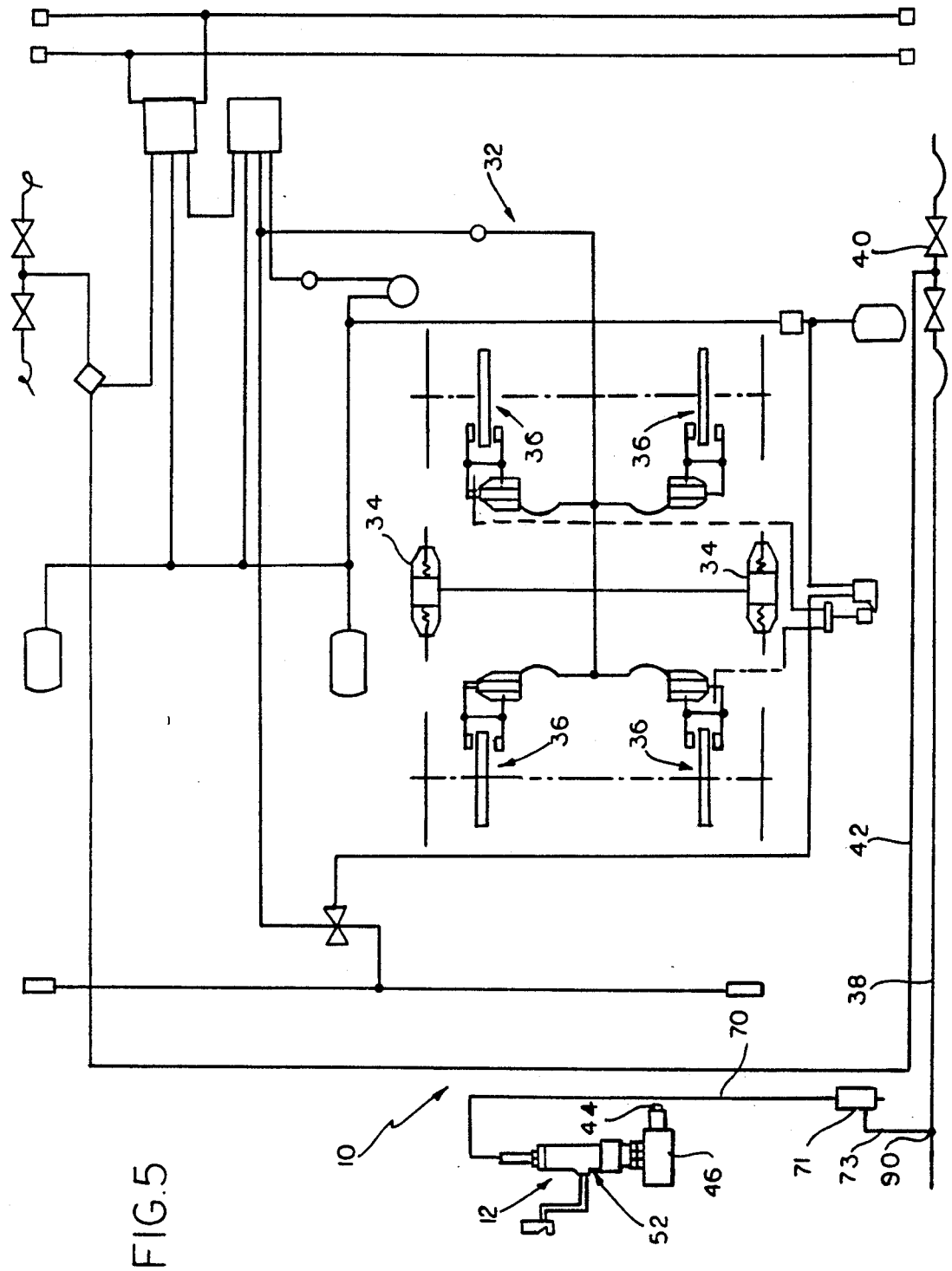
FIG. 5 is a schematic view showing an emergency railway air braking system incorporating the locking pin and safety unit or interlock device of the present invention.

Referring now more specifically to the drawings, wherein like parts are designated by the same numerals throughout the various figures, an emergency air braking system 10 including a safety or interlock unit 12 incorporating features of the present invention, is shown schematically in FIG. 5. The system 10 is constructed for use in a railway train, including a plurality of successive intermodal trailers 14, only one of which is shown in FIG. 1, which may be supported either by highway wheels 16 or a rail bogie 18. In the embodiment shown, a rail bogie is disposed beneath a rear end of a trailer, and is constructed for lifting the trailer sufficiently to raise the wheels 16 above the ground.

Figure 2:
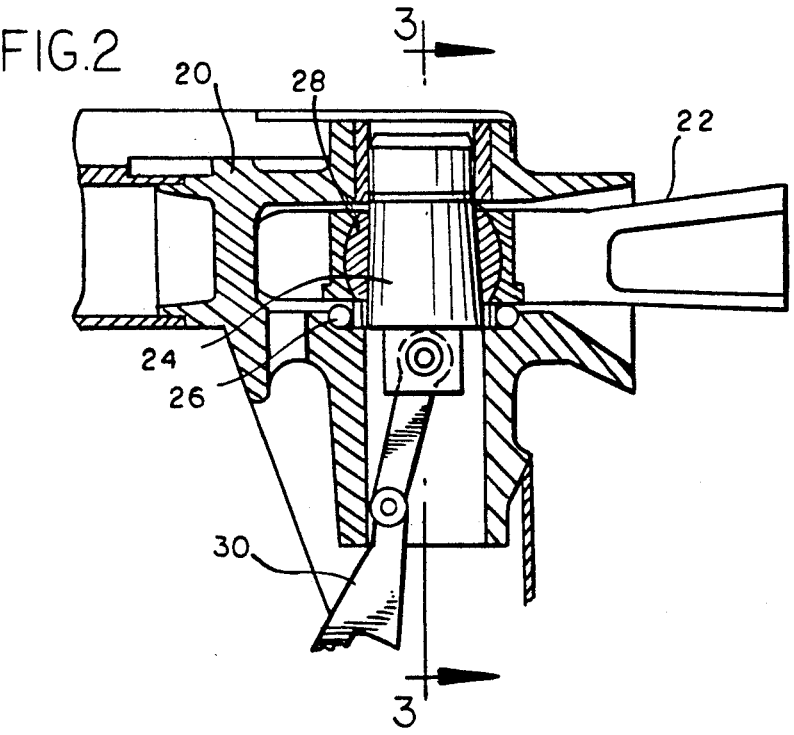
FIG. 2 is an enlarged, fragmentary, partial, sectional view showing a coupling pin mechanism, which may be used in association with a bimodal trailer of the type shown in FIG. 1 for coupling successive trailers together.

Each trailer 14 is provided with a socket 20, as indicated in FIGS. 1 and 2, at its rear end for receiving a tongue 22 extending from the forward end of a succeeding trailer. In order to connect adjacent trailers together, a coupling pin 24 is mounted either on the bogie 18 or directly on and beneath the trailer. In any event, the coupling pin 24 is adapted to be shifted between a retracted position and an extended position, as shown in FIG. 2, in which the pin extends through an aperture 26 and the socket or fitting 20, and also an aperture 28 in the tongue 22 for coupling the trailers together. A suitable linkage 30 is connected with the coupling pin 24 for shifting the coupling pin between the extended position shown in FIG. 2 and a retracted position in which the coupling pin is fully withdrawn from the tongue 22 for decoupling the trailers.

It is contemplated that the braking system 10 may incorporate any well-known pneumatic circuitry, generally designated by the numeral 32 for actuating brake units 34 and 36 associated with the wheels of the bogie. Since such brake units and pneumatic systems are well-known, they need not be described in detail. A pneumatic brake line or brake pipe 38, also known construction, extends through the trailer 14, and is provided with coupling means 40 at its opposite ends for enabling the pipe to be coupled to a pipe in an adjacent trailer, so as to form a continuous line from one end of a train to the other. During normal operation, relatively high air pressure is maintained in the brake pipe 38. The brake pipe is connected by a line 42 with the pneumatic system 32. The structure is such that when pressure is maintained in the brake pipe 38 and line 42, the brake units 34 and 36 are held in a deenergized position. In the event of a sudden drop in the line pressure, the brake units are actuated in a known manner.

In accordance with the present invention, means, including the interlock or safety unit 12, is provided for venting the brake pipe 38 whenever the coupling pin 24 is in a retracted position or disengaged from the tongue 22 of a trailer, so that the brake units 34 and 36 will be energized and the train cannot be moved. Referring more specifically to FIGS. 3 and 4, it is seen that the safety or interlock unit 12 includes a locking pin 44 slidably disposed in a fixed housing 46 mounted adjacent the coupling pin. A spring 48 is mounted within the housing for biasing the locking pin toward an extended position. As a result, the locking pin is adapted to snap beneath the coupling pin 24 when the coupling pin is in the extended trailer coupling position, as shown in FIGS. 2 and 3, whereby positively to prevent reverse movement of the pin and decoupling of the trailers A linkage mechanism 50 is connected with a rear end of the locking pin 44 and with a suitable actuator, not shown, whereby a trainman may withdraw the pin when it is desired to decouple the trailers.

An air valve 52, including a body 54, is connected with the housing 46. A sliding valve element 56 is disposed within a central bore 58 in the valve body 54 and includes a stem 60 extending into the housing 46 and engaging a reduced diameter portion 62 of the locking pin 44. The locking pin also includes a cam portion 64 disposed so that when the locking pin is retracted from the extended or locking position shown in FIG. 4, the cam surface 64 urges the valve stem 60 upwardly or outwardly against the action of a compression spring 66 disposed between a closed end 68 of the valve body 54 and the sliding valve element 56.

An air line 70 is provided for connecting an inlet 72 in housing 54 with a signal part of an emergency brake valve on relay valve 71, which in turn is connected by pipe 73 to the brake pipe. The inlet 72, in turn, communicates with the central bore 58 in the housing. The valve body is formed with an outlet passageway 78 communicating with an annular channel 80 surrounding the valve element 56. In order to provide for communication between the air inlet and the air outlet, an axially extending passageway 82 is formed in the valve element 56 from an upper end communicating with inlet 72 to across bore 84 for communicating with the channel 80. The arrangement is such that when the locking pin 44 is extended and the valve element 56 is in the position shown in FIG. 4, the passageway portion 84 is axially offset and disconnected from the annular passageway 80, so that no air can flow through the valve. However, when the locking pin 44 is shifted or retracted so that it is no longer in a position for locking the coupling pin, the cam surface 64 acting on the stem 60, shifts the valve element 56 sufficiently to connect the passageway 84 with the channel 80 so that air may flow through the outlet 78.

The air line 70 and the passageways through the valve 52 are relatively small, as compared with the diameter of the brake pipe 38, and connecting pipe 73 so that the air bleeding out through the passageway 78 when the valve 52 is opened is, by itself, usually insufficient to cause a pressure drop in the brake pipe which will actuate the emergency braking system of the train. In accordance with a feature of the present invention, the emergency brake valve or relay valve 71 is connected with the brake pipe 38 at 90, so that the brake pipe pressure will be quickly reduced when the valve 71 receives a pressure drop signal from the valve 52. The valve 71 may be of any known construction, such, for example, as a valve sold by Knorr-Bremer. The structure, as shown in FIG. 6, is such that when the valve receives a pressure signal through the line, the valve will open, so as to vent the brake pipe 38 and, thereby, cause actuation of the emergency braking system.

With the structure described above, it is seen that the interlock of the present invention will cause the brake units 34 and 36 to be energized whenever a coupling pin 24 is in a retracted or decoupling position. It is, of course, understood that a safety unit 12 will be provided for each trailer to be connected in a train. Thus, movement of the train will be prevented until all coupling pins have been properly positioned. Furthermore, in the event of some type of malfunction causing a coupling pin to be unintentionally retracted, the safety interlock unit will cause the emergency brake system of the train to be automatically energized without the need for any action on the part of a trainman.

In addition to automatically locking the brakes of the train whenever a coupling pin is in a retracted position, it is desirable to provide a signal observable by a trainman, so that the trainman can determine which coupling pin in a long line of trailers is not properly in position. Thus, a branch line 92 is connected with the outlet 78 and with a whistle 94 for providing an audible signal. The branch line 92 might also be connected with a mechanism, not shown, for extending some type of flag, which can be visually seen by a trainman.

While a preferred embodiment of the present invention has been shown and described herein, many structural details may be changed without departing from the spirit and scope of the appended claims.

The invention is claimed as follows:

1. A safety interlock for an air brake system having a brake pipe of an-intermodal train including a plurality of trailers coupled together with a coupling element shiftable between a coupling position and a decoupling position, said interlock comprising a locking element shiftable between a locking position operatively interconnected with said coupling element in a coupling position and an unlocking position, a first valve connectable with a source of air under pressure and including a valve element responsive to said locking element when the locking element is in said unlocked position to provide an air pressure signal, and a second valve responsive to said air pressure signal received from said first valve and connectable with the air pipe for venting the air pipe in response to said signal and thereby energizing the air brake.

2. A safety interlock, as defined in claim 1, which includes signaling means connected with said first valve for providing a signal discernible by a trainman in response to said air pressure signal.

3. A safety interlock, as defined in claim 2, wherein said signaling means provides an audible signal.

4. A safety interlock for a coupling element and an air brake system of a train, comprising a locking element shiftable between a retracted position and an extended coupling element locking position, an air valve, said air valve including a shiftable valve element responsive to said locking element for providing an air pressure signal when said locking element is in one of said positions and for terminating the signal when the locking element is in the other of said positions, and means responsive to said air pressure signal for energizing the train brake system when the locking element is retracted form said coupling positions, said coupling element including a cam surface, and said shiftable valve element being engageable with said cam surface.

5. A safety interlock, as defined in claim 4, which includes spring means for biasing said locking element toward said locking position, and linkage means for retracting said locking element.

* * * * *

UNITED STATES PATENT AND TRADEMARK OFFICE
CERTIFICATE OF CORRECTION

PATENT NO. : 5,297,858
DATED : March 29, 1994
INVENTOR(S) : Peter F. Zupan

It is certified that error appears in the above-indentified patent and that said Letters Patent is hereby corrected as shown below:

Column 6, Line 3 "element is retracted form" should be
— element is retracted from —

Signed and Sealed this

Thirtieth Day of August, 1994

Attest:

BRUCE LEHMAN

Attesting Officer    Commissioner of Patents and Trademarks